Patented Apr. 14, 1936

2,037,423

UNITED STATES PATENT OFFICE 2,037,423

RUBBER LATEX COMPOSITION

Paul La Frone Magill, Niagara Falls, N. Y., assignor to E. I. du Pont de Nemours & Company, Inc., Wilmington, Del., a corporation of Delaware No Drawing. Application October 26, 1934, Serial No. 750,173

2 Claims. (Cl. 134—17)

This invention relates to a solvent and diluting medium for rubber latex.

The known procedure for dissolving rubber latex is to use a neutral or very mildly alkaline aqueous solution, using preferably ammonia. Strong alkalies or acids or many organic solutions tend to coagulate the rubber. The aqueous solutions heretofore employed do not always possess the ability to dissolve other types of materials which it may be desirable to incorporate with rubber latex. Furthermore, combinations of rubber latex with certain organic natural materials often result in solutions subject to putrefaction.

An object of this invention is to provide a diluting agent for rubber latex which readily dissolves many other types of organic materials to form solutions having high resistance to putrefaction and which is without tendency to coagulate the latex. Other objects will be hereinafter apparent.

These objects are accomplished by diluting rubber latex with formamide, or with combinations of formamide and other materials. The use of formamide for this purpose, in accordance with my invention, is illustrated by the following examples:

Example 1

A quantity of formamide was mixed with an equal amount of rubber latex containing 38% dry rubber. The resulting solution was stable toward putrefaction and there was no coagulation of the rubber latex.

Example 2

Seventy grams of casein, 70 cc. of formamide, 150 cc. of water and 10 cc. of 20% aqueous ammonia were mixed cold, then heated to 90° C. with constant stirring and finally filtered. To this solution, there was added 150 cc. of rubber latex containing 38% by weight of dry rubber. This solution showed no tendency toward putrefaction over a period of one month. There was no coagulation of the rubber particles.

Example 3

Fifty grams of casein, 50 cc. of formamide, 50 cc. of water and 350 cc. of rubber latex containing 38% dry rubber were mixed and brought into a uniform solution. This solution showed no alteration on aging.

Example 4

Three-hundred grams of casein, 300 grams of formamide, 800 cc. of water and 20 cc. of 20% aqueous ammonia were mixed cold and heated to 80° C. To this solution there was added with good stirring 25 grams of linseed oil, 10 grams of castor oil, 100 grams zirconium oxide, 5 grams of ultra marine and 15 grams of ocher. To the resulting mixture there was then added 75 cc. of rubber latex containing 38% dry rubber. This mixture gave a paint which showed no tendency toward putrefaction or coagulation of the latex and after drying was resistant to water and had a high resistance to abrasion.

Example 5

Fifty grams of casein, 50 grams of formamide and 50 grams of water were mixed cold and heated with stirring to 85° C. To this there was added 300 cc. of rubber latex containing 38% dry rubber. 25 grams of this solution was then diluted with 100 cc. of water. Wool and flannel cloth were impregnated with this solution and dried. This treatment gave the cloth resistance to water and oil and resulted in improved mechanical characteristics.

Other materials may be incorporated with formamide-rubber latex mixtures such as starch, dyes, glue, gelatin, dextrin and albumin.

These diluted ruber latex mixtures have valuable properties for use in textile coating and impregnating media, leather dressings, printing inks, pains, adhesives and paper coating and impregnating compositions.

I claim:

1. A composition of matter comprising rubber latex and formamide.
2. A composition of matter comprising rubber latex, casein and formamide.

PAUL LA FRONE MAGILL.